United States Patent
LeBlanc et al.

(10) Patent No.: US 11,891,933 B2
(45) Date of Patent: *Feb. 6, 2024

(54) METHODS AND APPARATUS FOR PLUGGING CELLS OF CERAMIC STRUCTURES AND HONEYCOMB FILTERS

(71) Applicant: CORNING INCORPORATED, Corning, NY (US)

(72) Inventors: Philip Robert LeBlanc, Corning, NY (US); Robert Arthur Mcintosh, Corning, NY (US); Richard Henry Weachock, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/263,196

(22) PCT Filed: Jul. 15, 2019

(86) PCT No.: PCT/US2019/041756
§ 371 (c)(1),
(2) Date: Jan. 26, 2021

(87) PCT Pub. No.: WO2020/028018
PCT Pub. Date: Feb. 6, 2020

(65) Prior Publication Data
US 2021/0207509 A1 Jul. 8, 2021

Related U.S. Application Data

(60) Provisional application No. 62/712,387, filed on Jul. 31, 2018.

(51) Int. Cl.
*F01N 3/022* (2006.01)
*B28B 11/00* (2006.01)
(Continued)

(52) U.S. Cl.
CPC ....... *F01N 3/0222* (2013.01); *B01D 46/0001* (2013.01); *B28B 11/006* (2013.01);
(Continued)

(58) Field of Classification Search
None
See application file for complete search history.

(56) References Cited

U.S. PATENT DOCUMENTS

| 4,427,728 A | 1/1984 | Belmonte et al. |
| 4,557,962 A | 12/1985 | Belmonte et al. |

(Continued)

FOREIGN PATENT DOCUMENTS

| EP | 2105185 A2 | 9/2009 |
| JP | S6276785 A * | 4/1987 |

(Continued)

OTHER PUBLICATIONS

Machine English translation of JPS6276785A, Accessed Aug. 25, 22 (Year: 1987).*

(Continued)

*Primary Examiner* — S. Behrooz Ghorishi
(74) *Attorney, Agent, or Firm* — Joseph M. Homa

(57) ABSTRACT

A method for plugging a subset of cells of a honeycomb structure that includes: covering a first end face of the honeycomb structure with a mask that comprises a body and a plurality of openings, wherein the plurality of openings of the mask is coincident with a plurality of cells of the honeycomb structure; providing a plug of material upon a film material; applying a force to the film material to push the plug of material through the plurality of openings of the mask and into the plurality of cells of the honeycomb structure; and measuring a pressure within the plurality of cells during the applying step, wherein the applying step further comprises adjusting the force applied to the film (Continued)

material based at least in part on the pressure within the plurality of cells to push the plug of material to a predetermined depth within the plurality of cells.

19 Claims, 8 Drawing Sheets

(51) Int. Cl.
*B29C 43/18* (2006.01)
*B01D 46/00* (2022.01)
*B29C 70/76* (2006.01)
*B01D 46/24* (2006.01)

(52) U.S. Cl.
CPC ............ *B28B 11/007* (2013.01); *B29C 43/18* (2013.01); *B29C 70/766* (2013.01); *B01D 46/2418* (2013.01); *F01N 2330/06* (2013.01); *F01N 2330/30* (2013.01); *F01N 2350/02* (2013.01); *F01N 2560/08* (2013.01); *F01N 2560/14* (2013.01)

(56) References Cited

U.S. PATENT DOCUMENTS

| | | | |
|---|---|---|---|
| 4,752,516 A | 6/1988 | Montierth | |
| 5,021,204 A | 6/1991 | Frost et al. | |
| 5,720,787 A * | 2/1998 | Kasai | B01D 46/2455 55/282 |
| 6,673,300 B2 | 1/2004 | Allen et al. | |
| 6,699,428 B2 | 3/2004 | Nishi et al. | |
| 7,537,634 B2 | 5/2009 | Hatano et al. | |
| 7,611,560 B2 | 11/2009 | Ichikawa | |
| 7,722,791 B2 | 5/2010 | Kimura et al. | |
| 7,736,581 B2 | 6/2010 | Ito et al. | |
| 7,807,085 B2 | 10/2010 | Tsuji et al. | |
| 7,919,033 B2 | 4/2011 | Shoji et al. | |
| 7,922,951 B2 | 4/2011 | Mudd et al. | |
| 8,003,035 B2 | 8/2011 | Ito et al. | |
| 8,038,817 B2 | 10/2011 | Kawai et al. | |
| 9,822,681 B2 | 11/2017 | Kikuchi et al. | |
| 2005/0076991 A1 | 4/2005 | Fujita | |
| 2006/0131782 A1 | 6/2006 | Mudd et al. | |
| 2007/0184241 A1 | 8/2007 | Ichikawa | |
| 2007/0220855 A1 | 9/2007 | Ichikawa | |
| 2008/0128082 A1 | 6/2008 | Masuda et al. | |
| 2008/0251978 A1 | 10/2008 | Ito et al. | |
| 2012/0306123 A1 | 12/2012 | Maurey et al. | |
| 2013/0140736 A1 | 6/2013 | Joe et al. | |

FOREIGN PATENT DOCUMENTS

| | | | |
|---|---|---|---|
| JP | 2007038278 A | * | 2/2007 |
| WO | 2012/111675 A1 | | 8/2012 |

OTHER PUBLICATIONS

Machine English translation of JP2007038278A (Year: 2007).*
International Search Report and Written Opinion of the International Searching Authority; PCT/US19/41756; dated Nov. 14, 2019; 11 Pages; European Patent Office.

* cited by examiner

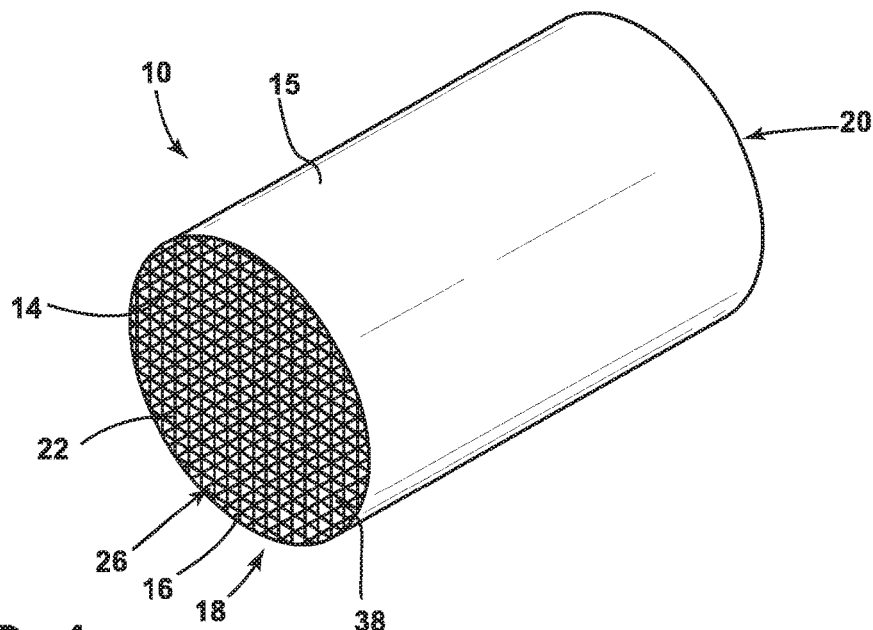
FIG. 1
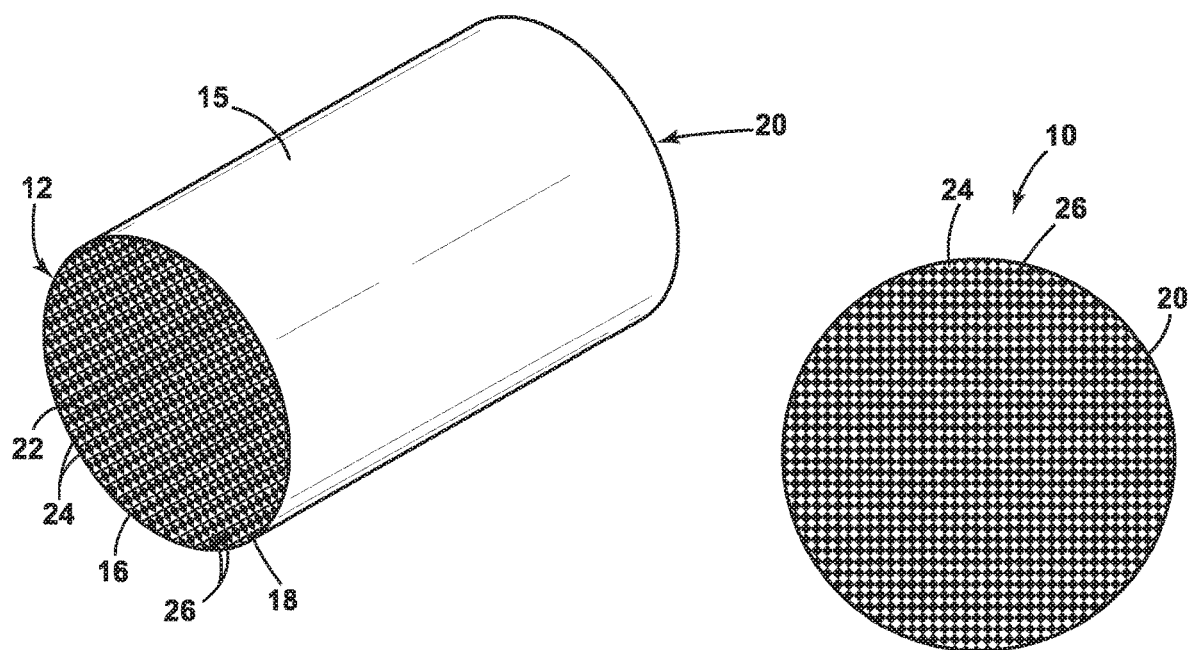
FIG. 2
FIG. 2A

METHODS AND APPARATUS FOR PLUGGING CELLS OF CERAMIC STRUCTURES AND HONEYCOMB FILTERS

This is a national stage application under 35 U.S.C. § 371 of International Application No. PCT/US2019/041756, filed on Jul. 15, 2019, which claims the benefit of priority under 35 U.S.C. § 119 of U.S. Provisional Application Ser. No. 62/712,387 filed on Jul. 31, 2018, the content of which is incorporated herein by reference in its entirety.

FIELD OF THE DISCLOSURE

The present disclosure is in the field of manufacturing technical ceramic structures, and particularly relates to methods and apparatus for selectively plugging cells of ceramic structures and honeycomb filters.

BACKGROUND

Various manufacturing processes and methods of making ceramic structures and honeycomb filters employ steps and apparatus to seal selected ends and channels of these articles.

SUMMARY OF THE DISCLOSURE

According to some aspects of the present disclosure, a method for plugging a subset of cells of a honeycomb structure is provided that comprises: covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure; providing a film material having an outer edge that also extends outwardly of at least a portion of the outer edge of the first end face of the honeycomb structure; providing a plug of material upon the film material; applying a force to the film material to push the plug of material through the plurality of openings of the mask and into the plurality of cells of the honeycomb structure; and measuring a pressure within the plurality of cells during the applying step, wherein the applying step further comprises adjusting the force applied to the film material based at least in part on the pressure within the plurality of cells to push the plug of material to a predetermined depth within the plurality of cells.

According to some aspects of the present disclosure, a method for plugging a subset of cells of a honeycomb structure is provided that comprises: covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure; providing a film material having an outer edge that also extends outwardly of at least a portion of the outer edge of the first end face of the honeycomb structures; providing a plug of material upon the film material; applying a force to the film material to push the plug of material through the plurality of openings of the mask and into the plurality of cells of the honeycomb structure; and measuring a pressure within the plurality of cells during the applying step, wherein the applying step further comprises adjusting the force applied to the film material based at least in part on the pressure within the plurality of cells to push the plug of material to a predetermined depth within the plurality of cells. Further, the step of applying a force to the film comprises providing an adjustable piston comprising a planar face that applies the force to the film material based at least in part on one or more of a yaw adjustment and a pitch adjustment to the planar face of the adjustable piston.

According to some aspects of the present disclosure, a method for plugging a subset of cells of a honeycomb structure is provided that comprises: covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure; providing a film material having an outer edge that also extends outwardly of at least a portion of the outer edge of the first end face of the honeycomb structure; providing a plug of material upon the film material; applying a force to the film material to push the plug of material through the plurality of openings of the mask and into the plurality of cells of the honeycomb structure; and measuring a pressure within the plurality of cells during the applying step, wherein the applying step further comprises adjusting the force applied to the film material based at least in part on the pressure within the plurality of cells to push the plug of material to a predetermined depth within the plurality of cells. Further, the step of applying a force to the film comprises providing an adjustable piston comprising an adjustable face that applies the force to the film material based at least in part on an adjustment to a height of the face of the piston at one or more XY positions on the face.

Additional features and advantages will be set forth in the detailed description which follows, and will be readily apparent to those skilled in the art from that description or recognized by practicing the embodiments as described herein, comprising the detailed description which follows, the claims, as well as the appended drawings.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 1 is a perspective view of an extruded filter body comprising a first end and a second end having a plurality of open-ended cells;

FIG. 2 is a perspective view of the first end of an extruded filter body configured comparably to the body depicted in FIG. 1, with a first subset of cells that are plugged, and a second subset of cells that are in an open-ended configuration;

FIG. 2A is a side view of the second end of the filter body of FIG. 2, with the first subset of cells that are in an open-ended configuration and the second subset of cells in a plugged configuration;

Figure 3:
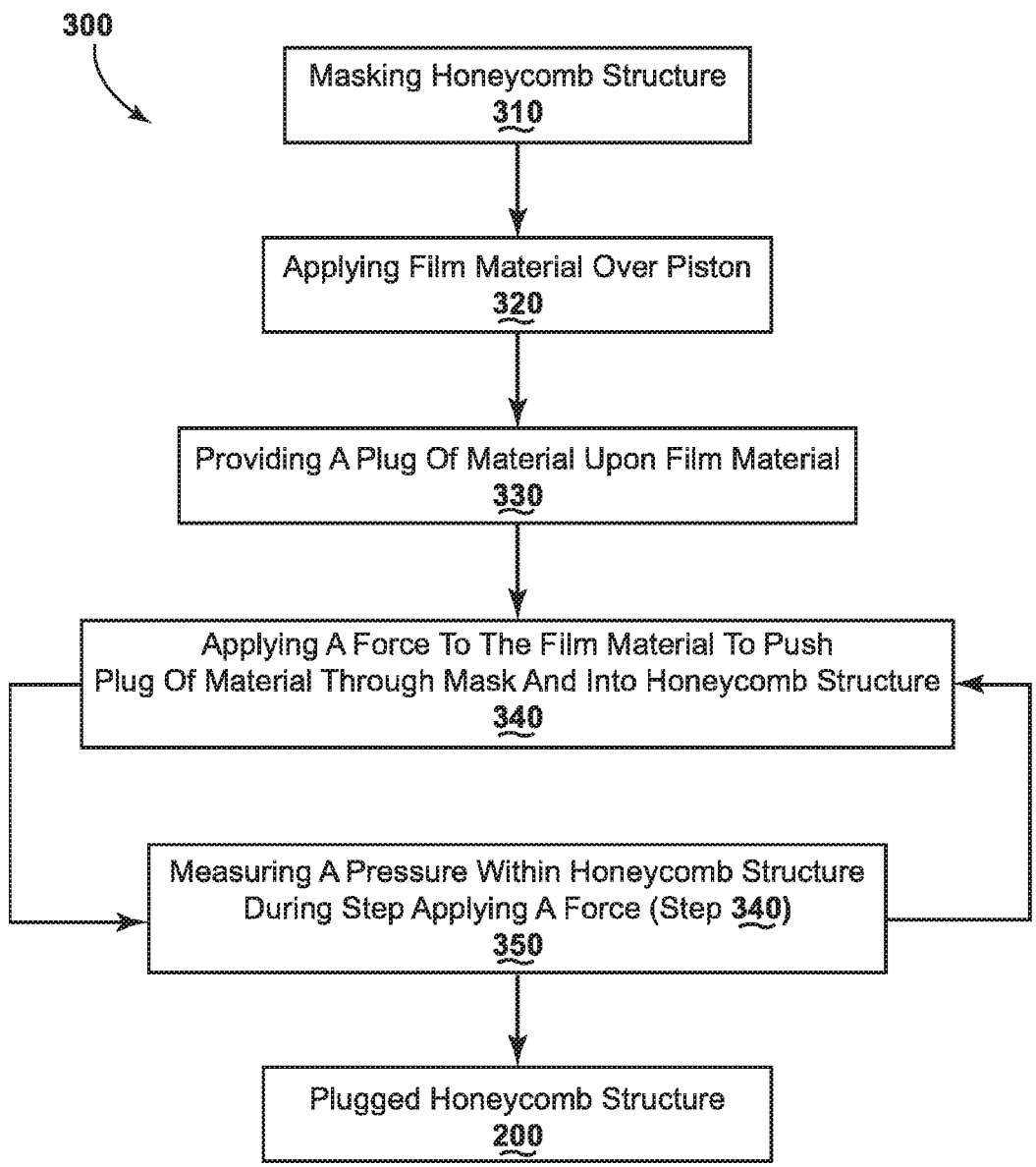
FIG. 3 is a schematic flow chart of a method for plugging a subset of cells of a honeycomb structure to form a plugged honeycomb structure.

The foregoing summary, as well as the following detailed description of certain inventive techniques, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION OF THE PREFERRED EMBODIMENTS

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to the drawings in general and to FIG. 1, in particular, it will be understood that the illustrations are for the purpose of describing particular embodiments and are not intended to limit the disclosure appended claims thereto. The drawings are not necessarily to scale, and certain features and certain views of the drawings may be shown exaggerated in scale or in schematic form in the interest of clarity and conciseness.

The methods and apparatus for plugging cells of ceramic structures and filters are generally applicable to the production of any of a number of complex ceramic shapes having open-ended cells, channels, tubes or comparable features. Advantageously, the methods and apparatus of the disclosure allow for the continuous monitoring of the alignment of the plugging fixtures and apparatus by measuring and evaluation plug pressure during the steps of applying plug material into these structures and filters. As the pressure data is generated and evaluated, the methods and apparatus can be employed to make adjustments (e.g., to a piston head orientation relative to a patty of the plug material) to improve the uniformity of plug length within the cells of the ceramic structures and filters. In turn, improved plug length uniformity can lead to improved part performance and higher production yields. Further, improved plug length control can lead to lower inspection costs and reduce production time.

Honeycomb structures having traverse cross-sectional cellular densities of approximately ten to one hundred cells or more per square centimeter have several uses, including solid particulate filter bodies and stationary heat exchangers. Wall flow particulate filter applications require selected cells of the structure to be sealed or plugged by a cement mixture, plug material and the like at one or both of the respective ends thereof. As used herein, the term "sealed" and other corresponding grammatical forms, i.e., sealant, sealing, etc., are used to refer to porous and non-porous methods of closing the open traverse cross-sectional areas of the cells of the ceramic structures, filters and bodies of the disclosure.

Referring now to FIG. 1, the reference numeral 10 generally designates a solid particulate ceramic filter body (also referred to herein as a "honeycomb structure"). The filter body 10 can be formed by a matrix of intersecting, thin, porous walls 14 surrounded by an outer wall 15, which in the illustrated example is provided in a circular cross-sectional configuration. The walls 14 extend across and between a first end face 18 and a plurality of cells 22. The cells 22 extend between and are open at the first end face 18 and the second end face 20, and form a large number of adjoining hollow passages in filter body 10. The outer wall 15 defines an outer edge 16 for both the first end face 18 and the second end face 20 (see also FIG. 2). Referring to FIGS. 2 and 2A, to plug the filter body 10, one end of each of the cells 22 is sealed with a plug material. In particular, a first subset 24 of the cells 22 is sealed at the first end face 18 (see FIG. 2), and a second subset 26 of the cells 22 is sealed at the second end face 20 of the filter body 10 (see FIG. 2A). Either the first end face 18 or second end face 20 may be used as the inlet face for the resulting filter body 10 in most configurations, e.g., when all of the cells 22 are of the same size.

In operation, contaminated fluid (e.g., particulate matter, such as exhaust soot) is brought under pressure to an inlet face (e.g., first end face 18 or second end face 20) and enters the filter 10 via those cells 22 which have an open end at the inlet face (e.g., a first subset 24 of the cells 22). Because these cells are sealed at the opposite end face, i.e., the outlet face (e.g., second end face 20 of the body 10), the contaminated fluid is forced through the thin porous walls 14 and into adjoining cells (e.g., a second subset 26 of the cells 22) which are sealed at the inlet face and open at the outlet face. The solid particulate contaminant in the fluid, which is too large to pass through the porous openings in the walls, is left behind and a cleansed fluid exits the filter 10 through the outlet cells, e.g., the second subset 26 of the cells 22.

Referring again to FIGS. 1, 2 and 2A, the honeycomb structures 10 for solid particulate filter bodies, and other applications, may be formed of a variety of materials comprising ceramics, glass-ceramics, glasses, metals, and by a variety of methods depending upon the material selected. Honeycomb structures, including the ceramic filter body 10, having the necessarily uniformed thin, porous and interconnected walls for solid particulate filtering applications are preferably fabricated from plastically formable and finely divided particles of substances that can be fired to yield a porous, sintered material. Suitable materials for the honeycomb structures and filter bodies 10 comprise metals, ceramics, glass-ceramics, and other ceramic based mixtures.

Figure 4A:
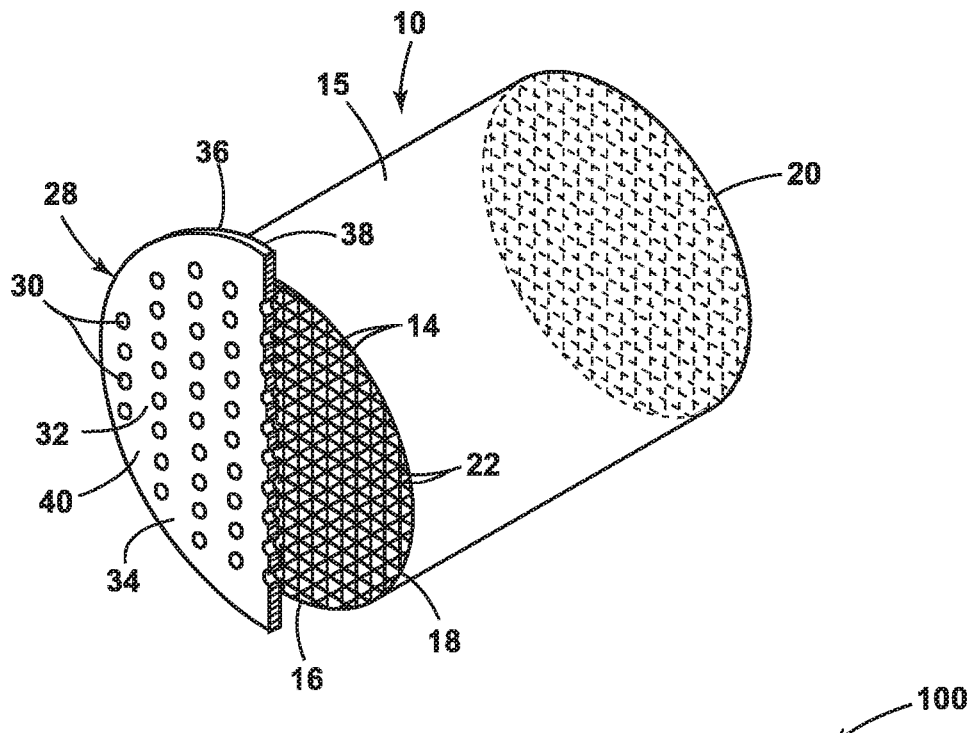
FIG. 4A is a perspective view of the first end of the extruded filter body of FIG. 2, as covered by a cross-sectioned mask.

Referring now to FIG. 3, a method 300 for plugging a subset of cells of a honeycomb structure 10 is provided. According to embodiments of the method 300, the method comprises a step 310 of masking a first end face 18 of the honeycomb structure 10 with a mask 28 that comprises a central body 32 having an outer edge 38 and a plurality of openings 30, wherein the outer edge 38 of the body extends 32 outwardly of at least a portion of an outer edge 16 of the first end face 18 of the honeycomb structure 10 and the plurality of openings 30 of the mask 28 is coincident with a plurality of cells 22 of the honeycomb structure 10 (see also FIG. 4A). According to embodiments of the method 300, either the first end face 18 or the second end face 20 of the honeycomb structure 10 is covered with the mask 28 as shown in FIG. 4A. In the illustrated example, the first end face 18 is covered by the mask 28 during step 310, and the mask 28 comprises an adhesive-backed, pressure-sensitive thin transparent or translucent film formed from a thermoplastic material, such as a polyester or polyethylene terephthalate (PET) material. Other materials are also suitable for the mask 28 comprising polyethylene, polypropylene, and polyurethane. Various processes can be employed to form a mask 28 of these materials, as would be understood by those of ordinary skill in the field of the disclosure. Further, the plurality of openings 30 are created through the mask 28 that correspond to the first subset 24 of the cells 22 or the second subset 26 of the cells 22 (see also FIGS. 2 and 2A). As would also be understood by those of ordinary skill in the field of the disclosure, the openings 30 can be created by any of a variety of means for opening such holes, depending on the material employed for the mask 28 (e.g., a laser tool, a stamping apparatus forming tool, a mold, etc.).

Referring again to step 310 of masking the honeycomb structure 10 (see FIGS. 3 and 4A), an exemplary mask 28 comprises a central body 32 with an outer face 34 and an opposing inner-face 36 with the plurality of openings 30 extending between the outer face 34 and the inner-face 36. In particular, the openings 30 are positioned within the body 32 of the mask 28 so as to coincide with the ends of the first subset 24 of the cells 22 (see FIGS. 2 and 2A) (e.g., when the mask 28 is employed over the first end face 18) or the second subset 26 of the cells 22 (see FIGS. 2 and 2A) (e.g., when the mask 28 is employed over the second end face 20) to be charged with plugging material (i.e., during step 340 as outlined in more detail below). The plurality of openings 30 of the mask 28 can be suitably sized to expose the open ends of the first subset 24 or second subset 26 of the cells 22, but not so large as to expose the adjacent subset of cells 22 (i.e., subset 26 or subset 24, respectively). In some embodiments, larger openings 30 can be provided to expose several adjacent cells 22, as desired. In addition, the mask 28 comprises an outer edge 38 and an outer periphery 40 that extends radially outwardly from the outer edge 16 of the first end face 18 (or the second end face 20 when the mask 28 is employed on this end). During the step 310, the body 32 of the mask 28 can be adhered to a matrix of walls 14 of the honeycomb structure 10 to hold the mask 28 in position. The mask 28, in some embodiments, can be adhered with acrylic adhesive (not shown) or any similar adhesive substance. In some implementations of the method 300, the adhesive can be applied to the mask 28 before step 310 of masking the honeycomb structure 10 is conducted.

Figure 4B:
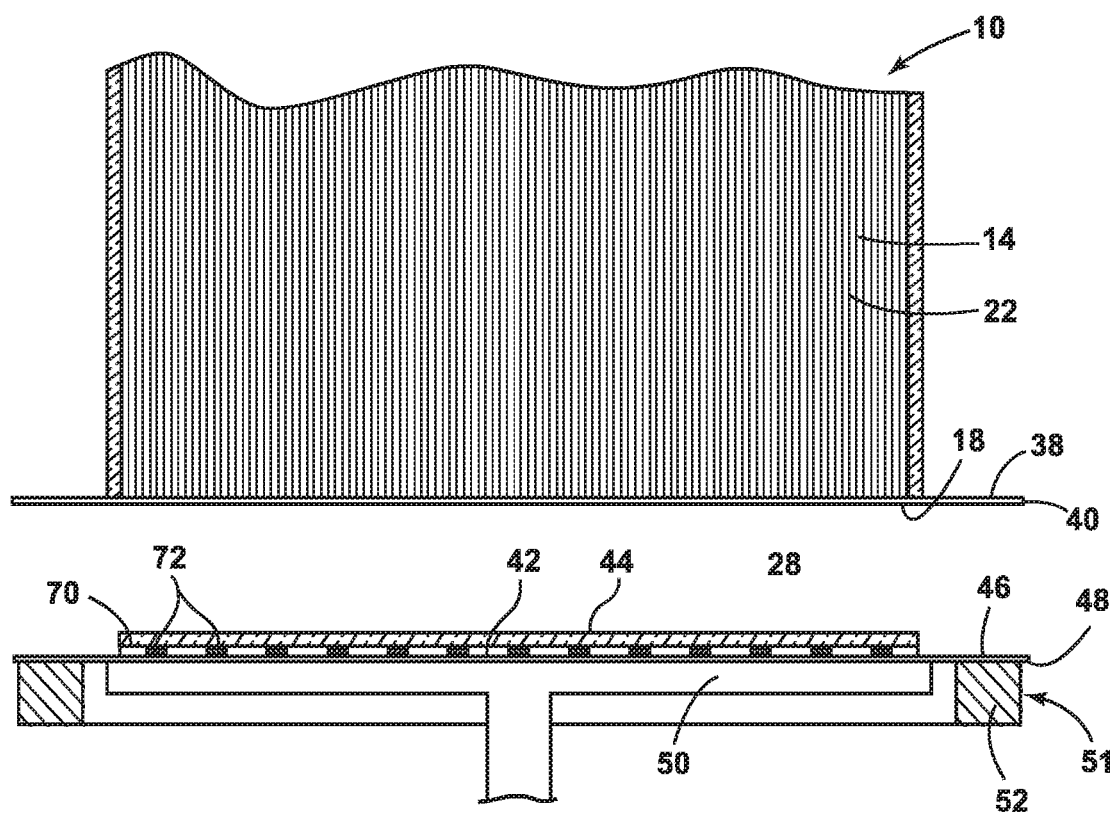
FIG. 4B is a side, cross-sectional view of the extruded filter body of FIG. 2, as covered by a mask, and a piston of a plugging apparatus, as covered by a film material, pressure sensor and a patty of plug material.

Now referring to FIGS. 3 and 4B, the method 300 for plugging a subset of cells of a honeycomb structure 10 further comprises a step 320 of providing a film material 42 over a piston 50 (or another comparable apparatus), as part of a plugging apparatus 100. Here, the film material 42 comprises a periphery 46 and an outer edge 48 that extends outwardly of at least a portion of the outer edge 16 (see FIGS. 1 and 2) of the first end face 18 of the honeycomb structure 10 (or the second end face 20 of the honeycomb structure 10 for embodiments in which the mask 28 is employed on the second end face 20). In some preferred embodiments, the film material 42 comprises a PET material. In other embodiments, the film material 42 comprises a thermoplastic material, such as polyester, PET, polyethylene, polypropylene, and polyurethane. In aspects of the method 300, step 320 is conducted to ensure that the film material 42 is positioned over the piston 50 of the plugging apparatus 100 and relative to the honeycomb structure 10 to ensure that the pressure applied to the plug material 44 is substantially uniform during subsequent steps of the method 300, e.g., step 340 of applying a force to the film material.

Referring again to FIGS. 3 and 4B, the method 300 for plugging a subset of cells of a honeycomb structure 10 also comprises a step 330 of providing a plug of material, or plugging material, 44 upon the film material 42. In embodiments, the plug of material 44 comprises a ceramic raw material with an aqueous binder, such as methylcellulose, plasticizer and water. As illustrated in FIG. 4B, the plug of material 44 is located with respect to the film material 42 such that the outer periphery 46 of the film material 42 is free from the plug of material 44. In embodiments, as shown in exemplary form in FIG. 4B, the plug of material 44 can be provided in the form of a flat patty of a uniform thickness. In other embodiments of the method 300, step 330 can be conducted such that the plug of material 44 is provided with a non-uniform thickness over the film material 42, e.g., based at least in part upon pressure data obtained during step 350 of measuring a pressure within a plurality of cells 22 during step 340 (see below for further description of steps 340 and 350). In particular, the non-uniformities in the thickness of the plug of material 44 can be introduced, based at least in part on the pressure data, to offset any non-uniformities that exist in the apparatus employed in the method 300 to ensure that the length of the plug of material 44 in the first subset 24 and the second subset 26 of cells 22 (see FIGS. 1 and 2) is highly uniform.

Figure 4C:
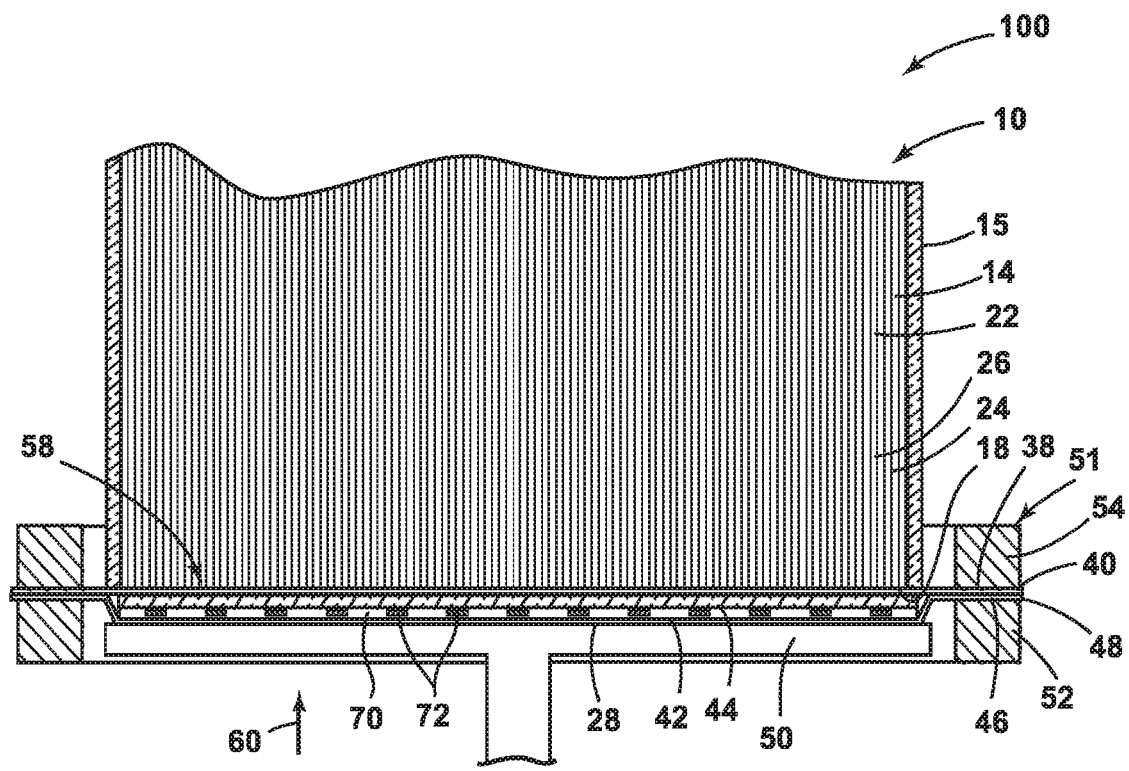
FIG. 4C is a side, cross-sectional view of the extruded filter body of FIG. 2, with the peripheral edges of the mask sealed with peripheral edges of a thin film.
Figure 4D:
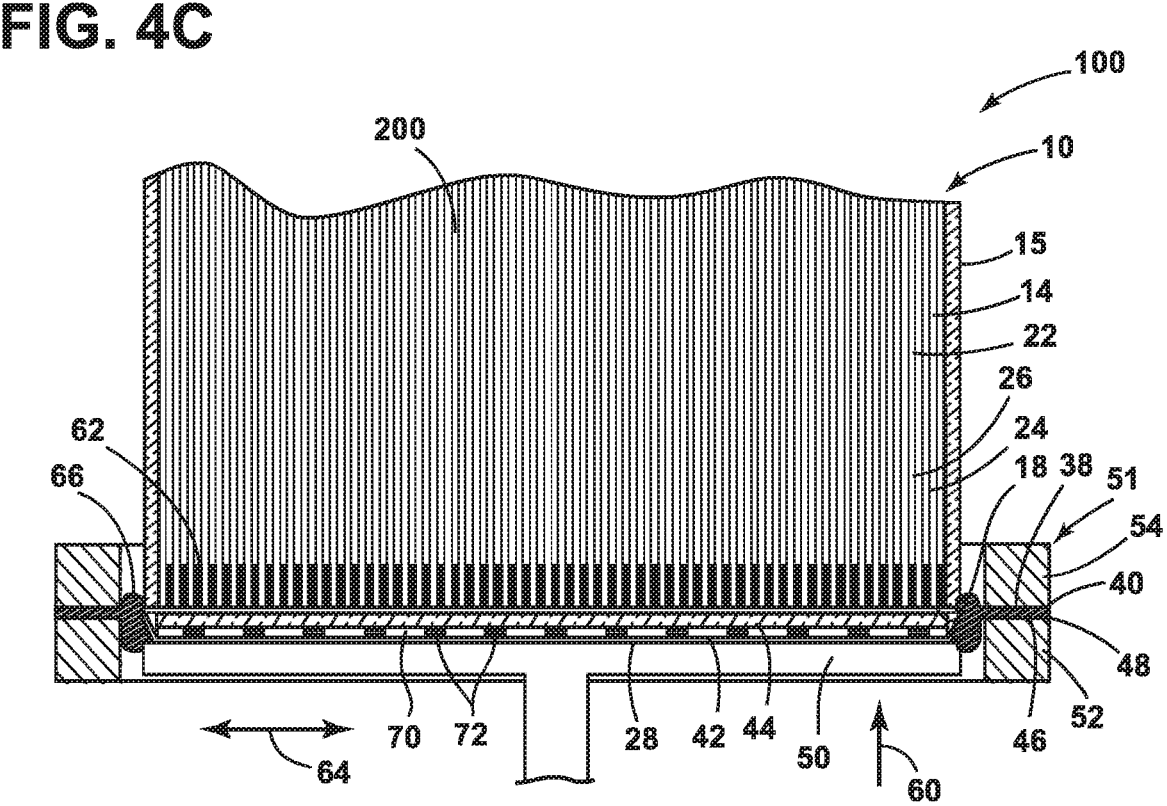
FIG. 4D is a side, cross-sectional view of the extruded filter body of FIG. 2, with plug material located within a subset of the cells of the filter body.

Again referring to steps 320 and 330 (see FIGS. 3 and 4B) of the method 300 for plugging a subset of cells of a honeycomb structure 10, the film material 42 with a plug of material 44 disposed thereon can be situated upon a piston 50 of the plugging apparatus 100, the piston 50 surrounded by a clamping assembly 51 having a first clamping portion 52 and a second clamping portion 54 (see also FIGS. 4C and 4D). Piston 50 can be shaped to correspond to the honeycomb structure 10 being plugged and is roughly of a comparable size to the part. The first clamping portion 52 and second clamping portion 54 of the clamping assembly 51 can be used to seal the periphery 46 of the film material 42.

Now referring to FIGS. 3, 4C and 4D, the method 300 for plugging a subset of cells of a honeycomb structure 10 further comprises a step 340 for applying a force 60 to the film material 42 to push the plug of material 44 through the plurality of openings 30 of the mask 28 and into the plurality of cells 22 of the honeycomb structure 10. In particular, the force 60 is generally applied in the direction as shown in FIGS. 4C and 4D to the film material 42 by the piston 50, thereby forcing the plug of material 44 through the openings 30 of the mask 28 and into the first subset 24 of the plurality of cells 22 (or second subset 26 of cells 22 for a mask positioned on the end face 20) of the honeycomb structure 10. As the plug of material 44 is pushed into the first subset 24 of cells 22, a plurality of plugs 62 is formed, as shown in FIG. 4D. In embodiments, excess of the plug of material 44 is forced laterally across the first end face 18 of the honeycomb structure 10 in a direction as indicated and represented by the directional arrow 64 and held within pockets 66 as defined by the outer periphery 40 of the mask 28 and the outer periphery 46 of the film material 42, and as located between the clamping assembly 51 and the piston 50. Further, the pocket 66 prevents any excess of the plug of material 44 from smearing along the outer wall 15 of the honeycomb structure 10. Also according to step 340, the piston 50 can be retracted away from the first end face 18 of the honeycomb structure 10 and the mask 28 and the film material 42 removed from the structure 10.

Referring again to FIGS. 3, 4C and 4D, the method 300 for plugging a subset of cells of a honeycomb structure 10 also comprises a step 350 for measuring a pressure within the plurality of cells 22 during the applying step 340. That is, a pressure is measured within the cells 22 during the step 340 for applying a force 60 to the film material 42 to push the plug of material 44 through the plurality of openings 30 (see FIG. 4A) of the mask 28 and into the plurality of cells 22. As such, step 350 can be employed to monitor the pressure in the first subset 24 of the cells 22 (or the second subset 26 of the cells) as the plug of material 44 is introduced into these cells. Further, according to the method 300, the applying step 340 further comprises adjusting the force 60 applied to the film material 42 based at least in part on the pressure within the plurality of cells 22 to push the plug of material 44 to a predetermined depth within the plurality of cells 22 (i.e., to form the plurality of plugs 62). Advantageously, the pressure measured during step 350 can be employed by the method 300 to control, adjust or otherwise monitor step 340 as the plug of material 44 is introduced into the honeycomb structure 10 to improve the uniformity of the length of the plurality of plugs 62 formed in the structure 10.

In embodiments of the method 300 (see FIGS. 3 and 4B-4D), step 350 can be conducted such that output data from a pressure sensor film 70 is evaluated. The pressure sensor film 70 can be disposed between the film material 42 and the plug of material 44, as depicted in FIGS. 4B-4D. Further, in embodiments, the pressure sensor film 70 can comprise a plurality of pressure sensors 72 (e.g., a sensor film as supplied by Tekscan™, Inc.). According to some implementations of the method 300, steps 340 and 350 are conducted such that the pressure measured in the cells 22 is a plurality of region pressures, with each region corresponding to a portion of the plurality of cells 22. Further, steps 340 and 350 can be conducted such that multiple pressures are measured within the honeycomb structure 10 (e.g., by virtue of a pressure sensor film 70 comprising a plurality of pressure sensors 72) that correspond to particular groups or regions of cells 22 at different locations on the first end face 18 (or second end face 20, as shown in FIG. 4A). In some implementations, the pressure data associated with these groups or regions of cells 22 can be employed by the method 300 to apply more than one force 60 to account for the varying pressure data. This pressure data can also be employed to create a pressure map of the first end face 18 or second end face 20 of the honeycomb structure 10 that plots the multiple pressures measured as a function of location or region of portions of the cells 22. In addition, the method 300 can be conducted such that step 330 further comprises providing the plug of material 44 at a non-uniform thickness based at least in part on prior-measured output pressure data obtained from the step 350 (e.g., as obtained from a different honeycomb structure fabricated according to the method 300), as employing a pressure sensor film 70 with a plurality of pressure sensors 72.

Referring to FIGS. 3 and 4D, the method 300 can be employed, upon completion of steps 310-350, to produce a plugged honeycomb structure 200, e.g., with a plurality of plugs 62 as located within a first subset 24 and a second subset 26 of cells 22. At this point, the plugged honeycomb structure 200 can be removed from within the plugging apparatus 100. According to embodiments of the method 300, the honeycomb structure 10 can be positioned in various orientations within the plugging apparatus 100, particularly with first end face 18 or the second end face 20 (see FIG. 4A) in a downward position relative to the piston 50. In some aspects of the method 300, those with ordinary skill in the art can appreciate that the plugging apparatus 100 could be modified to allow for the simultaneous or sequential injection of the plug of material 44 into both of the first end face 18 and second end face 20, particularly the first subset 24 and second subset 26 of cells 22.

Figure 5:
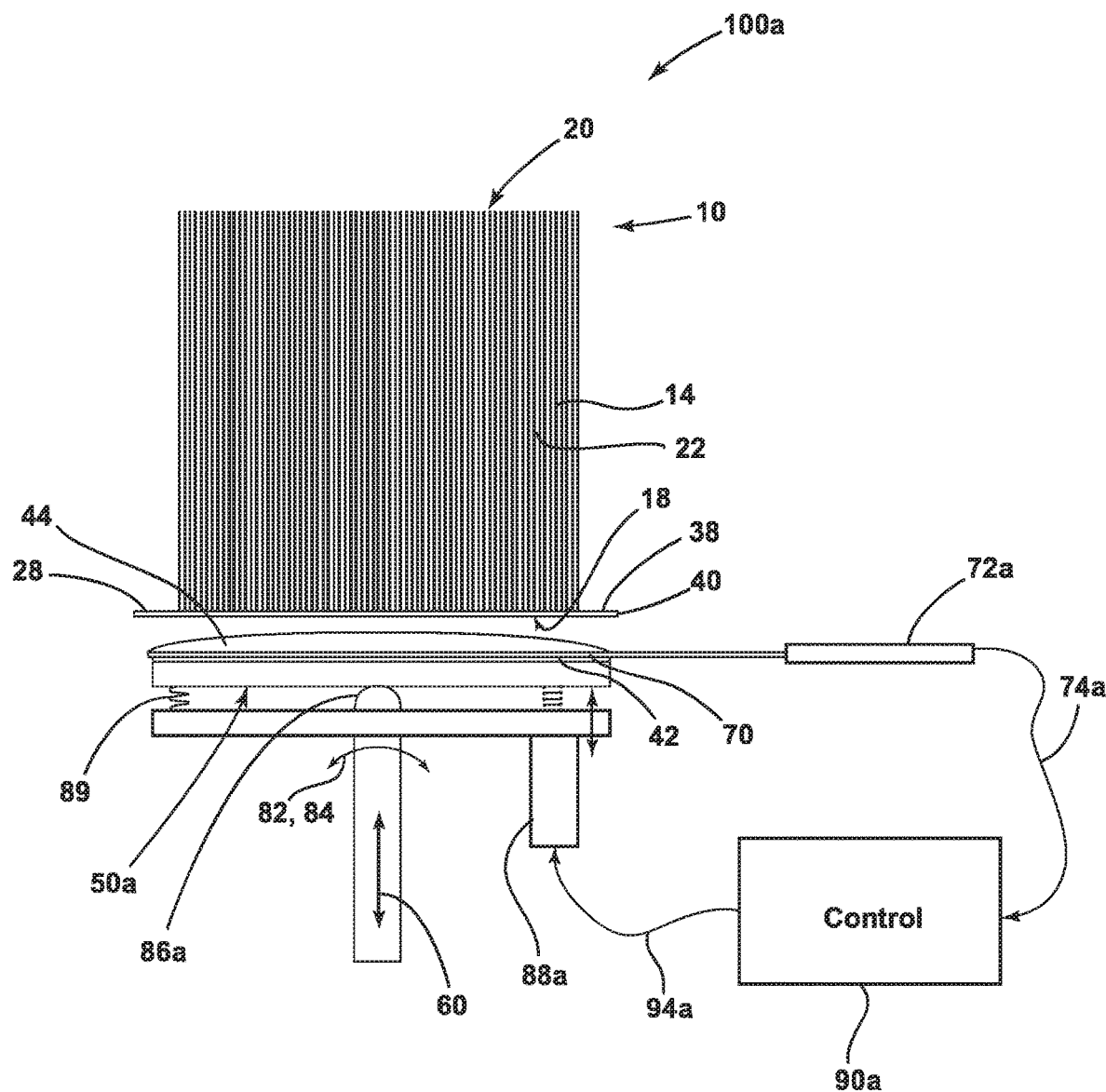
FIG. 5 is a side, cross-sectional view of a plugging apparatus with a pitch- and yaw-adjustable piston, an extruded filter body of FIG. 2 and a patty of plug material.
Figure 5A:
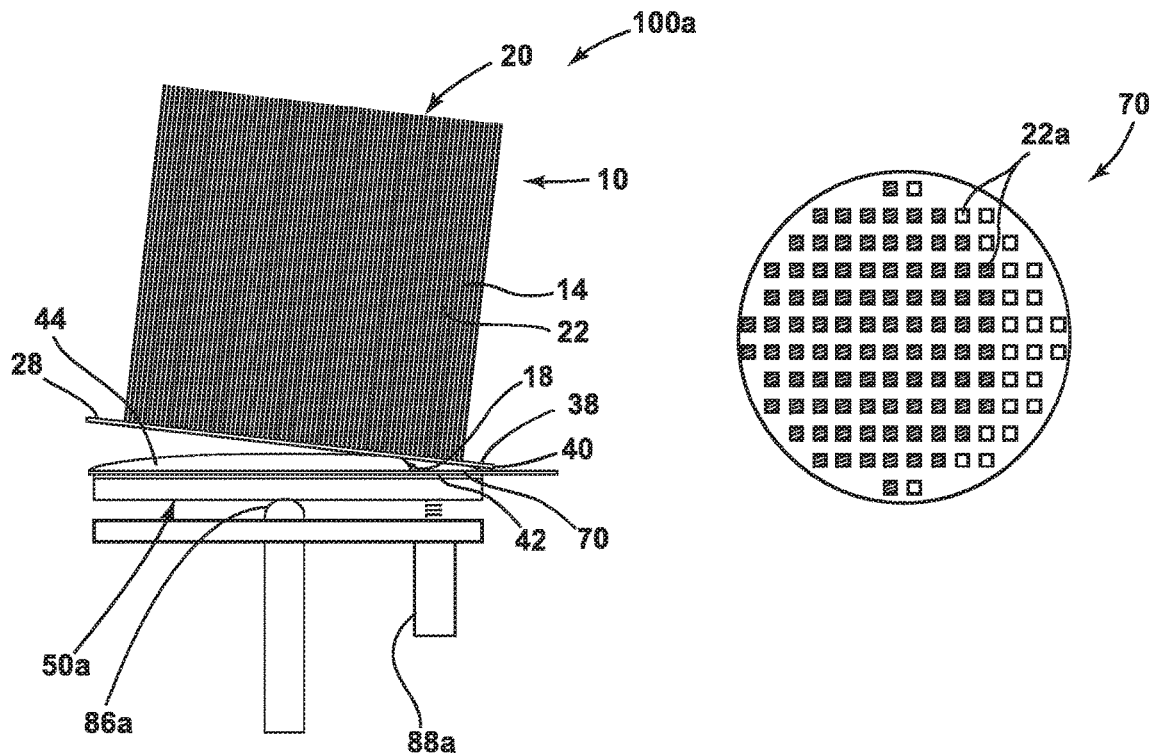
FIGS. 5A and 5B are side, cross-sectional views of the plugging apparatus and extruded filter body of FIG. 5, as employed in a method of plugging a subset of cells of the body.
Figure 5B:
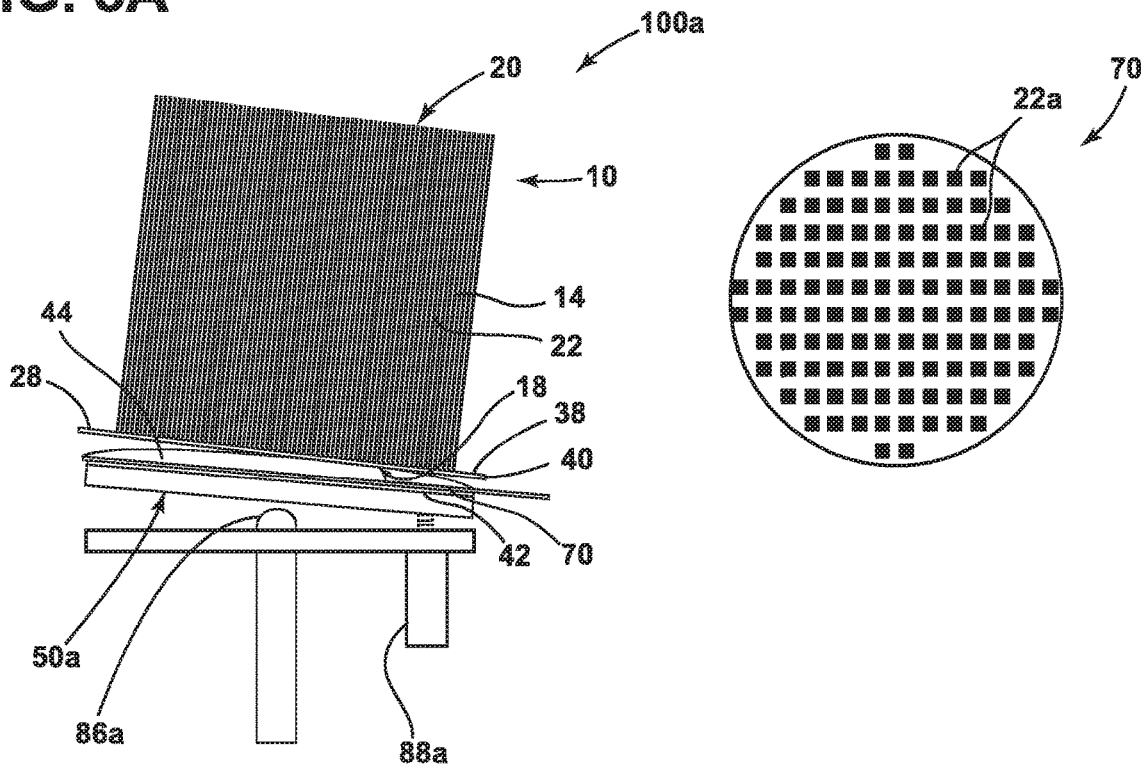

Turning to FIGS. 5-5B, the method 300 (see FIG. 3) for plugging a subset of cells 22 of a honeycomb structure 10 can employ an adjustable plugging apparatus 100a. In most respects, the plugging apparatus 100a depicted in FIGS. 5-5B is similar to the plugging apparatus 100 depicted in FIG. 4B-4D, with like-numbered elements having the same function and structure unless otherwise noted. One difference between the plugging apparatus 100 and adjustable plugging apparatus 100a is that the plugging apparatus 100a employs an adjustable piston 50a to apply the force 60 to the film material 42 to push the plug of material 44 into the cells 22 of the honeycomb structure 10. In particular, the plugging apparatus 100a can be employed to make yaw adjustments 82 and pitch adjustments 84 of the piston 50a, and the plug of material 44 disposed thereon, relative to the first end face 18 (or second end face 20) of the honeycomb structure 10 in response to pressure measured during the plugging that occurs during step 340. The net result is that the plugging apparatus 100a can be effectively employed to adjust the orientation of the piston 50a relative to cells 22 to improve the uniformity of the length of each of the plurality of plugs formed in the plugged honeycomb structure.

With regard to the method 300 depicted in FIG. 3, as employing the adjustable plugging apparatus 100a shown in FIGS. 5-5B, the method can be conducted in a similar fashion as outlined earlier. Notably, steps 310, 320 and 330 of the method 300 are conducted with plugging apparatus 100a, as detailed according to the description outlined earlier in connection with plugging apparatus 100 (see FIGS. 3 and 4A-4D, and corresponding description). According to this embodiment of the method 300 employing the adjustable plugging apparatus 100a, the method further comprises a step 340 for applying a force 60 to the film material 42 to push the plug of material 44 through the plurality of openings 30 of the mask 28 and into the plurality of cells 22 of the honeycomb structure 10. In particular, the force 60 is generally applied in the direction shown in FIG. 5 to the film material 42 by the adjustable piston 50a, thereby forcing the plug of material 44 through the openings 30 of the mask 28 and into the first subset 24 of the plurality of cells 22 of the honeycomb structure 10 (or second subset 26 of cells 22 for a mask positioned on the end face 20). As the plug of material 44 is pushed into the first subset 24 of cells 22, a plurality of plugs is formed (similar to the plurality of plugs 62 shown in FIG. 4D). Also according to step 340, the adjustable piston 50a can be retracted away from the first end face 18 of the honeycomb structure 10 and the mask 28 and the film material 42 removed from the structure 10.

Referring again to FIGS. 3, 5 and 5A, the method 300 for plugging a subset of cells of a honeycomb structure 10, as employing plugging apparatus 100a, also comprises a step 350 for measuring a pressure within the plurality of cells 22 during the applying step 340. A pressure is measured within the cells 22 during the step 340 for applying a force 60 to the film material 42 to push the plug of material 44 through the plurality of openings 30 of the mask 28 and into the plurality of cells 22. As such, step 350 can be employed to monitor the pressure in the first subset 24 of the cells 22 (or the second subset 26 of the cells 22) as the plug of material 44 is introduced and pushed into these cells. In embodiments of the method 300, as employing the plugging apparatus 100a, step 350 can be conducted such that output data from a pressure sensor film 70 is evaluated by a sensor monitor 72a, as coupled to a control module 90a via wiring 74a. The pressure sensor film 70 can be disposed between the film material 42 and the plug of material 44, as depicted in FIGS. 5 and 5A. Further, in embodiments, the pressure sensor film 70 can comprise a plurality of pressure sensors (e.g., as comparable to the pressure sensors 72 depicted in FIGS. 4B-4D).

Referring again to the method 300, as employing the adjustable plugging apparatus 100a, the applying step 340 further comprises adjusting the force 60 applied to the film material 42 based at least in part on the pressure within the plurality of cells 22 to push the plug of material 44 to a predetermined depth within the plurality of cells 22. More particularly, the plugging apparatus 100a can be employed to conduct the step 340 such that the force 60 is applied to the film material 42 based at least in part on one or more of a yaw adjustment 82 and a pitch adjustment 84 to the planar face of the adjustable piston 50a. In embodiments of the apparatus 100a, any one or more of a yaw adjustment 82 and a pitch adjustment 84 can be effected by the control module 90a, as coupled to one or more linear actuators 88a via wiring 94a. In embodiments, the linear actuator(s) 88a, in conjunction with one or more springs 89, can move the planar face of the piston 50a about a head 86a to effect the yaw and pitch adjustments 82, 84 (see also FIG. 5B). In embodiments, the portion of the head 86a in contact with the adjustable piston 50a is spherical or substantially spherical in shape. Further, step 350 of the method 300 can be conducted with the plugging apparatus 100a such that the yaw adjustments 82 and/or pitch adjustments 84 made to the piston 50a can be in response to the pressure measured during step 340 (e.g., as shown in FIGS. 5A and 5B). Advantageously, the pressure measured during step 350 can be employed by the method 300, and the control module 90a of the plugging apparatus 100a, to effect control of the adjustable piston 50a during step 340 as the plug of material 44 is introduced into the honeycomb structure 10 to improve the uniformity of the length of the plurality of plugs formed in the structure 10.

According to some implementations of the method 300 employing the plugging apparatus 100a (see FIGS. 3 and 5-5B), steps 340 and 350 are conducted such that the pressure measured in the cells 22 is a plurality of region pressures, with each region corresponding to a portion of the plurality of cells 22. Further, steps 340 and 350 can be conducted such that multiple pressures are measured within the honeycomb structure 10 by virtue of the control module 90a (see FIG. 5), as coupled to a pressure sensor film 70 that comprises a plurality of pressure sensors (e.g., as comparable to the pressure sensors 72 depicted in FIG. 4B). More particularly, these pressure sensors, as arranged on the pressure sensor film 70, correspond to particular groups or regions of cells 22 at different locations on the first end face 18 (or second end face 20). In some implementations, the pressure data associated with these groups or regions of cells 22 can be employed by the method 300 to apply more than one force 60 to account for the varying pressure data obtained for these groups or regions by virtue of movements and adjustments to the adjustable piston 50a. This pressure data can also be employed to create a pressure map of the first end face 18 or second end face 20 of the honeycomb structure 10 that plots the multiple pressures measured as a function of location or region of portions 22a of the cells 22 (see FIG. 5A, which depicts portions 22a as squares of different shading to denote different pressures measured at these locations). The pressure map developed by the plugging apparatus 100a according to the method 300 can then be used to conduct step 340 to employ yaw adjustments 82 and pitch adjustments 84 to the adjustable piston 50a to provide more uniform application of the force 60 to inject the plug of material 44 into the cells 22 of the honeycomb structure 10 which, in turn, leads to a pressure map with a more uniform pressure distribution (see FIG. 5B, which depicts portions 22a as squares having the same solid shading to denote that substantially the same pressure is measured at each of these portions 22a of the cells 22). In addition, the method 300 can be conducted with the adjustable plugging apparatus 100a such that step 330 further comprises providing the plug of material 44 at a non-uniform thickness based at least in part on prior-measured output pressure data obtained from the step 350 (e.g., as obtained from one or more honeycomb structures previously made according to the method 300), as employing a pressure sensor film 70 with a plurality of pressure sensors.

Referring again to FIGS. 3 and 5-5B, the method 300 can be employed with the adjustable plugging apparatus 100a, upon completion of steps 310-350, to produce a plugged honeycomb structure 200, e.g., with a plurality of plugs 62 as located within a first subset 24 and a second subset 26 of cells 22 (e.g., as shown in FIG. 4D). At this point, the plugged honeycomb structure 200 can be removed from within the adjustable plugging apparatus 100a. According to embodiments of the method 300 employing the plugging apparatus 100a, the honeycomb structure 10 can be positioned in various orientations within the apparatus 100a, particularly with first end face 18 or the second end face 20 in a downward position relative to the adjustable piston 50a. In some aspects of the method 300, those with ordinary skill in the art can appreciate that the plugging apparatus 100a could be modified to allow for the simultaneous or sequential injection of the plug of material 44 into both of the first end face 18 and second end face 20, particularly the first subset 24 and second subset 26 of cells 22.

Figure 6:
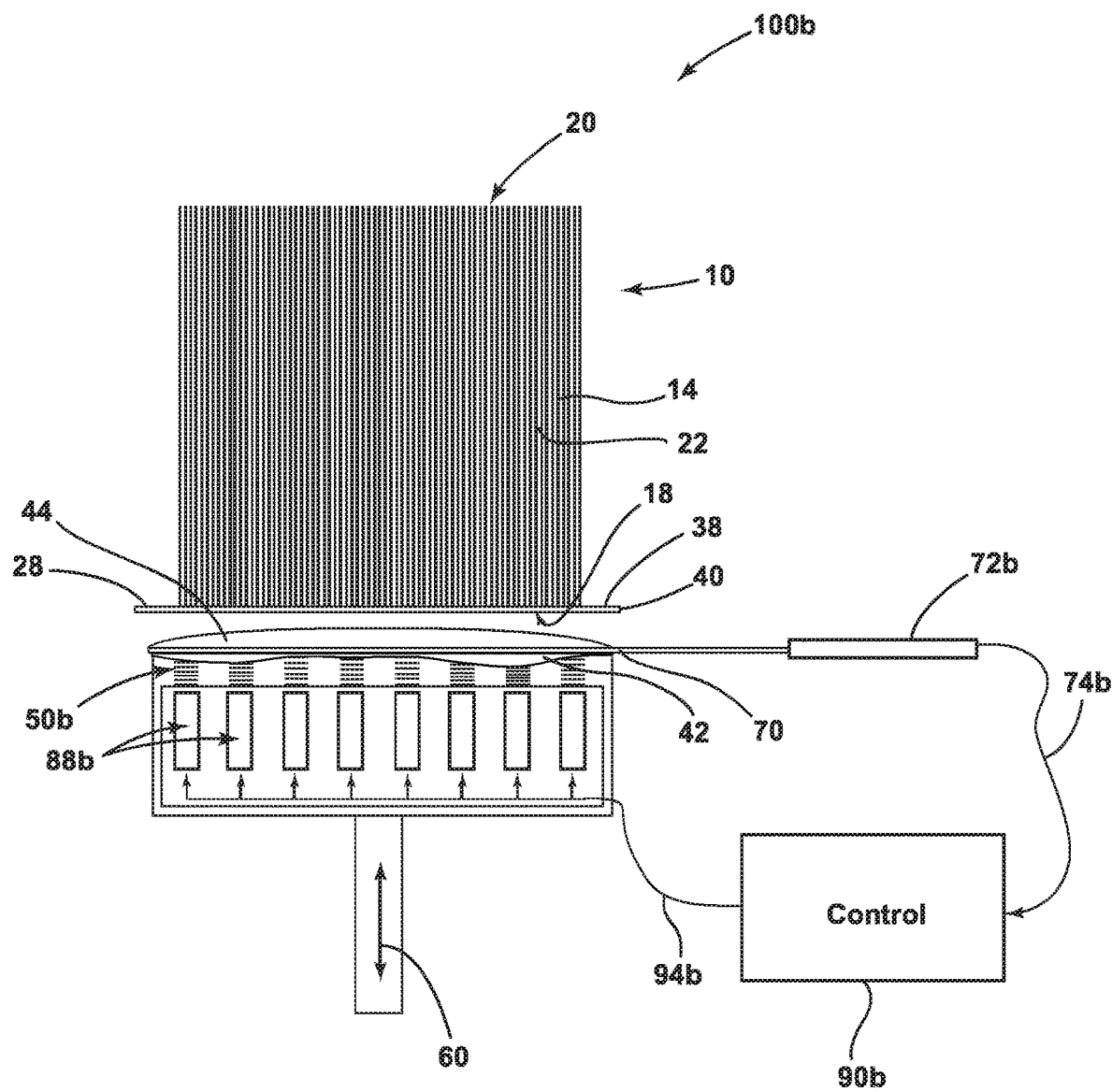
FIG. 6 is a side, cross-sectional view of a plugging apparatus with a dynamically adjustable piston head, an extruded filter body of FIG. 2 and a patty of plug material.
Figure 6A:
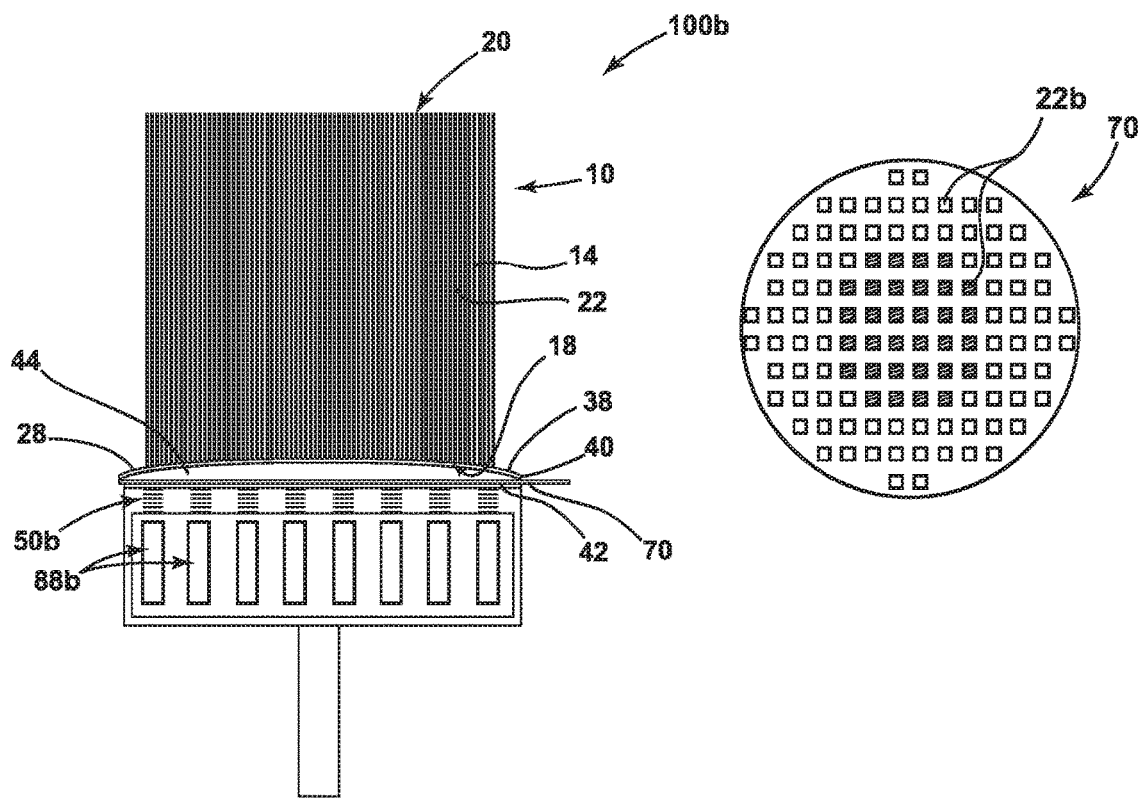
FIGS. 6A and 6B are side, cross-sectional views of the plugging apparatus and extruded filter body of FIG. 6, as employed in a method of plugging a subset of cells of the body.
Figure 6B:
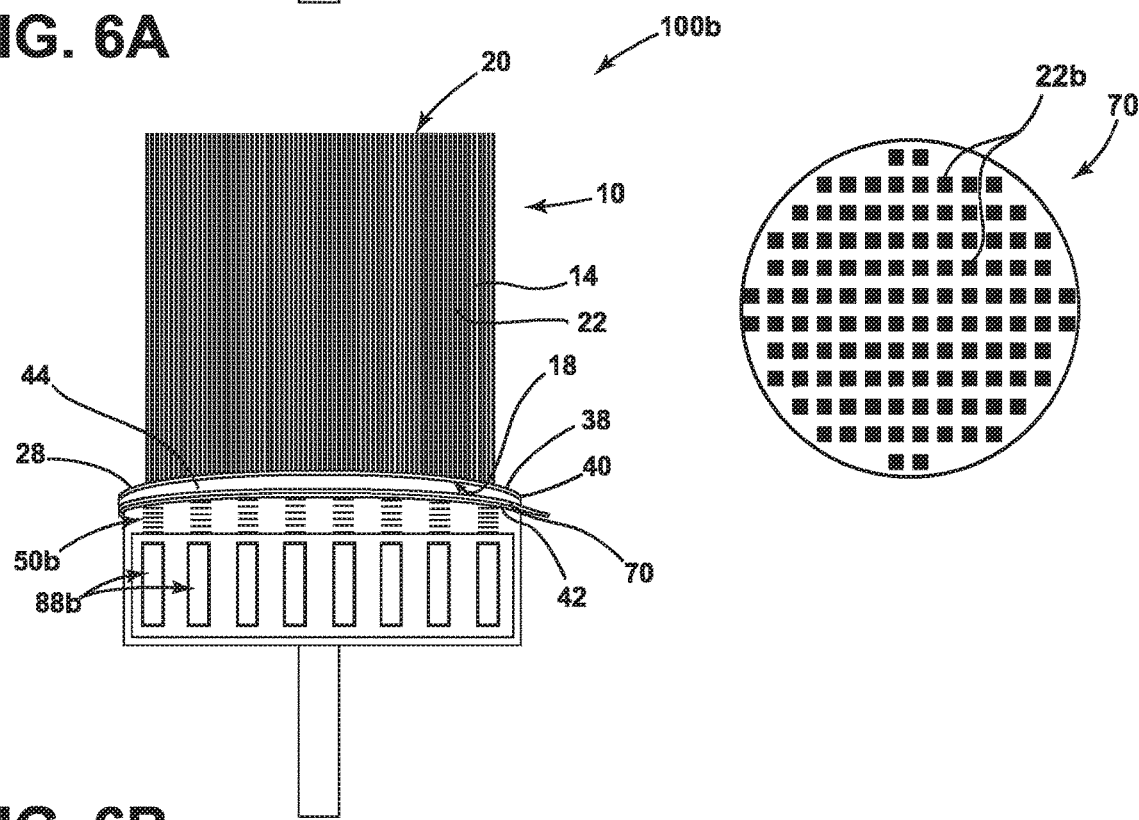

Turning to FIGS. 6-6B, the method 300 (see FIG. 3) for plugging a subset of cells 22 of a honeycomb structure 10 can employ an adjustable plugging apparatus 100b. In most respects, the plugging apparatus 100b depicted in FIGS. 6-6B is similar to the plugging apparatus 100 depicted in FIG. 4B-4D, with like-numbered elements having the same function and structure unless otherwise noted. One difference between the plugging apparatus 100 and adjustable plugging apparatus 100b is that the plugging apparatus 100b employs an adjustable piston 50b to apply the force 60 to the film material 42 to push the plug of material 44 into the cells 22 of the honeycomb structure 10. In particular, the plugging apparatus 100b can be employed to make height adjustments to the piston 50b through vertical movement of the film material 42 at one or more XY positions (see also FIG. 6B). Further, the vertical movements of the film material 42, and the plug of material 44 disposed thereon, are made relative to the first end face 18 (or second end face 20) of the honeycomb structure 10 in response to pressure measured during the plugging that occurs during step 340. The net result is that the plugging apparatus 100b can be effectively employed to adjust the orientation of the piston 50b relative to cells 22 to improve the uniformity of the length of each of the plurality of plugs formed in the plugged honeycomb structure.

With regard to the method 300 depicted in FIG. 3, as employing the adjustable plugging apparatus 100b shown in FIGS. 6-6B, the method can be conducted in a similar fashion as outlined earlier. Notably, steps 310, 320 and 330 of the method 300 are conducted with plugging apparatus 100b according to the description outlined earlier in connection with plugging apparatus 100 (see FIGS. 3 and 4A-4D, and corresponding description). According to this embodiment of the method 300 employing the adjustable plugging apparatus 100b, the method further comprises a step 340 for applying a force 60 to the film material 42 to push the plug of material 44 through the plurality of openings 30 of the mask 28 and into the plurality of cells 22 of the honeycomb structure 10. In particular, the force 60 is generally applied in the direction shown in FIG. 6 to the film material 42 by the adjustable piston 50b, thereby forcing the plug of material 44 through the openings 30 of the mask 28 and into the first subset 24 of the plurality of cells 22 of the honeycomb structure 10 (or second subset 26 of cells 22 for a mask positioned on the end face 20). As the plug of material 44 is pushed into the first subset 24 of cells 22, a plurality of plugs is formed (similar to the plurality of plugs 62 shown in FIG. 4D). Also according to step 340, the adjustable piston 50b can be retracted away from the first end face 18 of the honeycomb structure 10 and the mask 28 and the film material 42 removed from the structure 10.

Referring again to FIGS. 3, 6 and 6A, the method 300 for plugging a subset of cells of a honeycomb structure 10, as employing plugging apparatus 100b, also comprises a step 350 for measuring a pressure within the plurality of cells 22 during the applying step 340. A pressure is measured within the cells 22 during the step 340 for applying a force 60 to the film material 42 to push the plug of material 44 through the plurality of openings 30 of the mask 28 and into the plurality of cells 22. As such, step 350 can be employed to monitor the pressure in the first subset 24 of the cells 22 (or the second subset 26 of the cells 22) as the plug of material 44 is introduced and pushed into these cells. In embodiments of the method 300, as employing the plugging apparatus 100b, step 350 can be conducted such that output data from a pressure sensor film 70 is evaluated by a sensor monitor 72b, as coupled to a control module 90b via wiring 74b. The pressure sensor film 70 can be disposed between the film material 42 and the plug of material 44, as depicted in FIGS. 6 and 6A. Further, in embodiments, the pressure sensor film 70 can comprise a plurality of pressure sensors (e.g., as comparable to the pressure sensors 72 depicted in FIGS. 4B-4D).

Referring again to the method 300, as employing the adjustable plugging apparatus 100b, the applying step 340 further comprises adjusting the force 60 applied to the film material 42 based at least in part on the pressure within the plurality of cells 22 to push the plug of material 44 to a predetermined depth within the plurality of cells 22. More particularly, the plugging apparatus 100b can be employed to conduct the step 340 such that the force 60 is applied to the film material 42 based at least in part on an adjustment to a height of the face of the adjustable piston 50b at one or more XY positions on the face of the piston 50b. In turn, these adjustments to the height of the face of the piston 50b move the film material 42 and the plug of material 44 (see FIGS. 6A and 6B). In embodiments of the apparatus 100b, any one or more of the adjustments to height of the face of the adjustable piston 50b can be effected by the control module 90b, as coupled to a plurality of linear actuators 88b via wiring 94b. In embodiments, the plurality of linear actuators 88b can move the height of the planar face of the piston 50b, and film material 42 (see also FIG. 6B). Further, step 350 of the method 300 can be conducted with the plugging apparatus 100b such that the height adjustments made to the adjustable piston 50b at various XY positions can be in response to the pressure measured during step 340 (e.g., as shown in FIGS. 6A and 6B). Advantageously, the pressure measured during step 350 can be employed by the method 300, and the control module 90b of the plugging apparatus 100b, to effect control of the adjustable piston 50b during step 340 as the plug of material 44 is introduced into the honeycomb structure 10 to improve the uniformity of the length of the plurality of plugs formed in the structure 10.

According to some implementations of the method 300 employing the plugging apparatus 100b (see FIGS. 3 and 6-6B), steps 340 and 350 are conducted such that the pressure measured in the cells 22 is a plurality of region pressures, with each region corresponding to a portion of the plurality of cells 22. Further, steps 340 and 350 can be conducted such that multiple pressures are measured within the honeycomb structure 10 by virtue of the control module 90b (see FIG. 6), as coupled to a pressure sensor film 70 that comprises a plurality of pressure sensors (e.g., as comparable to the pressure sensors 72 depicted in FIG. 4B). More particularly, these pressure sensors, as arranged on the pressure sensor film 70, correspond to particular groups or regions of cells 22 at different locations on the first end face 18 (or second end face 20). In some implementations, the pressure data associated with these groups or regions of cells 22 can be employed by the method 300 to apply more than one force 60 to account for the varying pressure data obtained for these groups or regions by virtue of movements and adjustments to the adjustable piston 50b. This pressure data can also be employed to create a pressure map of the first end face 18 or second end face 20 of the honeycomb structure 10 that plots the multiple pressures measured as a function of location or region of portions 22b of the cells 22 (see FIG. 6A, which depicts portions 22b as squares of different shading to denote different pressures measured at these locations). The pressure map developed by the plugging apparatus 100b according to the method 300 can then be used to conduct step 340 to employ various height adjustments to the face of the adjustable piston 50b at various XY positions along the face of the piston to provide more uniform application of the force 60 to inject the plug of material 44 into the cells 22 of the honeycomb structure which, in turn, leads to a pressure map with a more uniform pressure distribution (see FIG. 6B, which depicts portions 22b as squares having the same solid shading to denote that substantially the same pressure is measured at each of these portions 22b of the cells 22). In addition, the method 300 can be conducted with the adjustable plugging apparatus 100b such that step 330 further comprises providing the plug of material 44 at a non-uniform thickness based at least in part on prior-measured output pressure data obtained from the step 350 (e.g., as obtained from one or more honeycomb structures previously made according to the method 300), as employing a pressure sensor film 70 with a plurality of pressure sensors.

Referring again to FIGS. 3 and 6-6B, the method 300 can be employed with the adjustable plugging apparatus 100b, upon completion of steps 310-350, to produce a plugged honeycomb structure 200, e.g., with a plurality of plugs 62 as located within a first subset 24 and a second subset 26 of cells 22 (e.g., as shown in FIG. 4D). At this point, the plugged honeycomb structure 200 can be removed from within the adjustable plugging apparatus 100b. According to embodiments of the method 300 employing the plugging apparatus 100b, the honeycomb structure 10 can be positioned in various orientations within the apparatus 100b, particularly with first end face 18 or the second end face 20 in a downward position relative to the adjustable piston 50b. In some aspects of the method 300, those with ordinary skill in the art can appreciate that the plugging apparatus 100b could be modified to allow for the simultaneous or sequential injection of the plug of material 44 into both of the first end face 18 and second end face 20, particularly the first subset 24 and second subset 26 of cells 22.

While exemplary embodiments and examples have been set forth for the purpose of illustration, the foregoing description is not intended in any way to limit the scope of the disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A method for plugging a subset of cells of a honeycomb structure, the method comprising:
   covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure;
   bringing a film material and the honeycomb structure into contact with each other, the film material having an outer edge that also extends outwardly of at least a portion of the outer edge of the first end face of the honeycomb structure;
   applying a force to the film material to push a plugging material through the plurality of openings of the mask and into the plurality of cells of the honeycomb structure; and
   adjusting the force applied to the film material based at least in part on a pressure within the plurality of cells to push the plugging material to a predetermined depth within the plurality of cells.

2. The method of claim 1, wherein a piston applies the force to the film material.

3. The method of claim 1, wherein the mask comprises a polymer material.

4. The method of claim 1, wherein the plugging material has a substantially uniform thickness as the force is applied.

5. The method of claim 1, wherein the pressure within the plurality of cells of the honeycomb structure is measured by evaluating output data from a pressure sensor film disposed between the film material and the plugging material, the pressure sensor film comprising a plurality of pressure sensors.

6. The method of claim 5, wherein the pressure within the plurality of cells of the honeycomb structure is measured as a plurality of region pressures, each region pressure corresponding to a portion of the plurality of cells of the honeycomb structure.

7. The method of claim 6, wherein a plurality of forces are applied to regions of the film material based at least in part on the plurality of region pressures.

8. The method of claim 5, wherein the plugging material comprises a non-uniform thickness based at least in part on prior-measured output data from the pressure sensor film.

9. A method for plugging a subset of cells of a honeycomb structure, the method comprising:
    covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure;
    bringing a film material and the honeycomb structure into contact with each other, the film material having an outer edge that also extends outwardly of at least a portion of the outer edge of the first end face of the honeycomb structure;
    applying a force to the film material to push a plugging material through the plurality of openings of the mask and into the plurality of cells of the honeycomb structure; and
    adjusting the force applied to the film material based at least in part on a pressure within the plurality of cells to push the plugging material to a predetermined depth within the plurality of cells,
    wherein the force applied to the film material is provided by an adjustable piston comprising a planar face that applies the force to the film material based at least in part on one or more of a yaw adjustment and a pitch adjustment to the planar face of the adjustable piston.

10. The method of claim 9, wherein the mask comprises a polymer material.

11. The method of claim 9, wherein the plugging material has a substantially uniform thickness during the applying step.

12. The method of claim 9, wherein the pressure within the plurality of cells of the honeycomb structure is measured by evaluating output data from a pressure sensor film disposed between the film material and the plugging material, the pressure sensor film comprising a plurality of pressure sensors.

13. The method of claim 12, wherein the pressure within the plurality of cells of the honeycomb structure is measured as a plurality of region pressures, each region pressure corresponding to a portion of the plurality of cells of the honeycomb structure.

14. The method of claim 13, wherein the force applied to the film material by the adjustable piston is a plurality of forces applied to regions of the film material based at least in part on the plurality of region pressures.

15. The method of claim 12, wherein the plugging material has a non-uniform thickness based at least in part on prior-measured output data from the pressure sensor film.

16. A method for plugging a subset of cells of a honeycomb structure, the method comprising:
    covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure;
    bringing a film material and the honeycomb structure into contact with each other, the film material having an outer edge that also extends outwardly of at least a portion of the outer edge of the first end face of the honeycomb structure;
    applying a force to the film material to push a plugging material through the plurality of openings of the mask and into the plurality of cells of the honeycomb structure; and
    adjusting the force applied to the film material based at least in part on a pressure within the plurality of cells to push the plugging material to a predetermined depth within the plurality of cells, and
    wherein the force to the film material is provided by an adjustable piston comprising an adjustable face that applies the force to the film material based at least in part on an adjustment to a height of the adjustable face of the piston at one or more XY positions on the adjustable face.

17. The method of claim 16, wherein the mask comprises a polymer material.

18. The method of claim 16, wherein the plugging material has a substantially uniform thickness during the applying step.

19. The method of claim 16, wherein the pressure within the plurality of cells of the honeycomb structure is measured by evaluating output data from a pressure sensor film disposed between the film material and the plugging material, the pressure sensor film comprising a plurality of pressure sensors.

* * * * *